(12) United States Patent
Peterreins

(10) Patent No.: US 10,451,057 B2
(45) Date of Patent: Oct. 22, 2019

(54) LIQUID PUMP/ELECTRIC MOTOR COMBINATION

(71) Applicant: BÜHLER MOTOR GMBH, Nürnberg (DE)

(72) Inventor: Thomas Peterreins, Nürnberg (DE)

(73) Assignee: BÜHLER MOTOR GMBH, Nürnberg (DE)

( * ) Notice: Subject to any disclaimer, the term of this patent is extended or adjusted under 35 U.S.C. 154(b) by 0 days.

(21) Appl. No.: 15/837,395

(22) Filed: Dec. 11, 2017

(65) Prior Publication Data

US 2018/0100503 A1   Apr. 12, 2018

Related U.S. Application Data

(63) Continuation of application No. PCT/DE2016/200271, filed on Jun. 9, 2016.

(30) Foreign Application Priority Data

Jun. 15, 2015   (DE) .......................... 10 2015 210 908

(51) Int. Cl.
*F04C 2/10*   (2006.01)
*F04C 15/00*   (2006.01)
(Continued)

(52) U.S. Cl.
CPC .............. *F04C 2/10* (2013.01); *F04C 15/008* (2013.01); *H02K 5/128* (2013.01); *H02K 5/167* (2013.01);
(Continued)

(58) Field of Classification Search
CPC .. F04B 17/03; F04C 2/082; F04C 2/10; F04C 2/102; F04C 2/103; F04C 15/008;
(Continued)

(56) References Cited

U.S. PATENT DOCUMENTS 2,938,755 A * 5/1960 Lee .................. F16C 23/045
                                                    384/204
3,361,068 A * 1/1968 Wochner ............. F04C 14/02
                                                    417/287
(Continued)

FOREIGN PATENT DOCUMENTS

DE              81321 A5      4/1971
DE          3249469 A1       7/1984
(Continued)

OTHER PUBLICATIONS

Search Report dated Jan. 18, 2016, issued in counterpart German application No. 10 2015 210 908.9 (8 pages).
(Continued)

*Primary Examiner* — Patrick Hamo
*Assistant Examiner* — Joseph S. Herrmann
(74) *Attorney, Agent, or Firm* — Westerman, Hattori, Daniels & Adrian, LLP

(57) ABSTRACT

A liquid pump/motor combination powered by an electric motor, preferably, an oil pump or reducing-agent pump with an electric motor, a positive displacement pump and a bearing shield arranged between the electric motor and the positive displacement pump. The liquid pump/motor combination comprises a positive displacement pump; an electric motor; and a bearing shield having a contact face, the bearing shield arranged between the electric motor and the positive displacement pump. A spherical bearing is accommodated in the bearing shield, the spherical bearing, under application of a force, being able to swivel to a limited extent. A connecting shaft is accommodated in the spherical bearing. The connecting shaft is positioned between the electric motor and the pump. An annular bearing gap, filled with liquid, is between the inside diameter of the spherical
(Continued)

bearing and the connecting shaft. The arrangement functions as a hydrodynamic sliding bearing.

9 Claims, 2 Drawing Sheets

(51) Int. Cl.
*H02K 5/167* (2006.01)
*H02K 5/128* (2006.01)

(52) U.S. Cl.
CPC ........ *H02K 5/1672* (2013.01); *F04C 2240/40* (2013.01); *F04C 2240/50* (2013.01); *F04C 2240/54* (2013.01); *F04C 2240/601* (2013.01)

(58) Field of Classification Search
CPC .............. F04C 2240/40; F04C 2240/50; F04C 2240/54; F04C 2240/601; F16C 23/043; F16C 23/045; F16C 23/046; F16C 2360/42–45; H02K 5/128; H02K 5/167; H02K 5/1672
See application file for complete search history.

(56) References Cited

U.S. PATENT DOCUMENTS

| | | | | | |
|---|---|---|---|---|---|
| 4,008,928 | A | * | 2/1977 | Abel | F16C 23/045 384/207 |
| 4,598,220 | A | * | 7/1986 | Stone | F16C 33/103 310/90 |
| 4,958,988 | A | * | 9/1990 | Regev | F04D 7/06 417/366 |
| 5,237,231 | A | * | 8/1993 | Blaettner | H02K 1/17 310/239 |
| 5,447,376 | A | * | 9/1995 | Cunningham | F16C 23/045 384/192 |
| 5,564,909 | A | * | 10/1996 | Rischen | B60T 8/4022 417/273 |
| 5,677,584 | A | * | 10/1997 | Keck | H02K 5/1672 310/90 |
| 5,683,184 | A | * | 11/1997 | Striedacher | F16C 23/04 384/138 |
| 6,884,043 | B2 | * | 4/2005 | Kimberlin | F04C 11/008 417/355 |
| 8,313,294 | B2 | * | 11/2012 | Laing | F04D 29/0467 415/229 |
| 9,470,219 | B2 | * | 10/2016 | Kato | F04D 13/06 |
| 9,581,159 | B2 | * | 2/2017 | Sugihara | F04B 17/03 |
| 2007/0182259 | A1 | * | 8/2007 | Sakata | F04C 15/008 310/90 |

FOREIGN PATENT DOCUMENTS

| | | |
|---|---|---|
| DE | 19806077 A1 | 6/1999 |
| DE | 19952201 A1 | 5/2001 |
| DE | 9422487 U1 | 4/2004 |
| DE | 10144653 B4 | 5/2006 |

OTHER PUBLICATIONS

International Search Report dated Sep. 2, 2016, issued in parent International Application No. PCT/DE2016/200271 (2 pages).

* cited by examiner

LIQUID PUMP/ELECTRIC MOTOR COMBINATION

CROSS-REFERENCE TO RELATED APPLICATIONS

The present patent application is a continuation of International application No. PCT/DE2016/200271, filed Jun. 9, 2016, which claims priority from German Application No. 102015210908.9, filed Jun. 15, 2015, both of which are incorporated herein by reference in their entireties.

BACKGROUND OF THE INVENTION

(1) Field of the Invention

The invention concerns a liquid pump powered by an electric motor, in particular, an oil pump or reducing-agent pump with an electric motor, a positive displacement pump, in particular, a gear pump, and a bearing shield arranged between the electric motor and the positive displacement pump.

(2) Description of Related Art Including Information Disclosed Under 37 CFR 1.97 and 1.98

Hydrodynamic sliding bearings are advantageously used in positive displacement pumps for liquids in order to absorb high radial forces and, at the same time, provide a cost-optimized bearing method.

In the prior art, a precise hole in a bearing cover of a pump is used, because an axially uniform bearing gap is required for hydrodynamic sliding bearings. This requires that only slight offset and slight tilting of a connecting shaft take place. If, however, an integrated motor pump is to be constructed, it will not be possible to satisfy the requirements regarding the exact alignment of the connecting shaft at the location of the bearing, due to long tolerance chains and imprecisions in the manufacturing processes of the individual components involved in the assembled device.

DE 101 44 653 B4 discloses a generic pump, in which a bearing shield is arranged between an electric motor and a pump. A sintered sleeve bearing is provided at the passage for a connecting shaft between a permanent magnet rotor and the pump, the bearing functioning at high speeds as a hydrodynamic bearing. This makes the pump suitable for different liquids, including oil, and for different speeds.

BRIEF SUMMARY OF THE INVENTION

It is an object of the present invention, in the case of a liquid pump powered by an electric motor, to provide a bearing which can be manufactured economically, tolerate imprecisions in manufacture, and absorb high radial forces. The invention concerns a liquid pump powered by an electric motor. Examples of this are an oil pump or a reducing-agent pump coupled with an electric motor, a positive displacement pump, in particular, a gear pump, and a bearing shield arranged between the electric motor and the positive displacement pump.

Manufacturing inaccuracies can easily be compensated for by the fact that the bearing shield accommodates a spherical bearing, which can swivel to a limited extent under application of a force F. Since the spherical bearing accommodates a connecting shaft between the electric motor and the gear pump, wherein an annular bearing gap, filled with liquid, can remain between the inside diameter of the spherical bearing and the connecting shaft, and since the arrangement consisting of spherical bearing, connecting shaft, and liquid-filled bearing gap acts in operation as a hydrodynamic sliding bearing, high radial forces can be absorbed. Since spherical bearings are used in conventional electric motors in large numbers, and are also easy to install, very economical production is also possible. Sliding bearings with special configurations also fall within the scope of the present invention.

As is usual with spherical bearings, a clamping spring is provided, even in the case of the present invention, to produce a clamping force between the bearing and the bearing shield. Here, the spherical bearing is pressed by the clamping spring against a contact face, which is conical, facet-shaped, or hollow-spherical at least in some areas, of the bearing shield.

Here, the clamping spring is so dimensioned that a force component acting axially on the spherical bearing is greater than a counterforce ($F_P$) generated by a liquid pressure and acting axially on the spherical bearing. It is important here that no axial movements occur either, not even briefly, as this would create unpleasant noises.

On the other hand, the clamping force must not be too great, so as to allow the spherical bearing to tilt as tolerance compensation due to hydrodynamic forces. At the least, the bearing should align itself according to the geometric conditions no later than following the first time it ramps up to high speeds and/or experiences a radial force from the outside, wherein a liquid gap ensues between the connecting shaft and spherical bearing.

As is appropriate for its purpose, the spherical bearing should, as is usual in many dry applications, take the form of a sintered sleeve bearing and have pore-shaped interstices which can be filled with liquid, in particular, oil. These interstices act as a lubricant reservoir and can also, in exceptional cases, when the liquid level drops, provide sufficient lubrication.

Integrating the liquid pump and the electric motor will result in a compact design. To do so, the motor housing can, for example, be extended axially to create a space for installation of the pump.

BRIEF DESCRIPTION OF THE SEVERAL VIEWS OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE INVENTION

Figure 1:
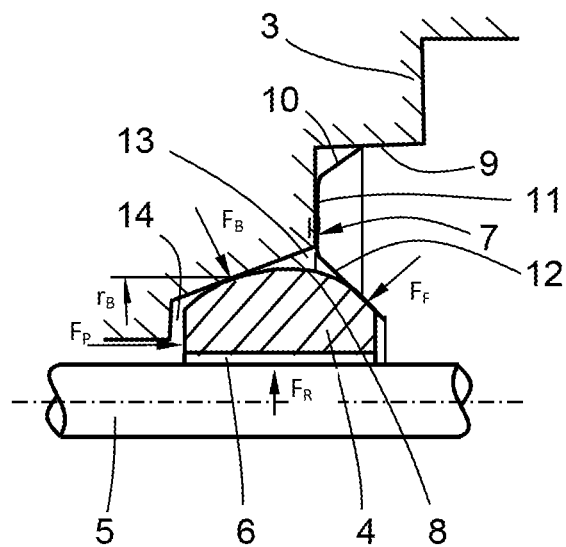
FIG. 1 shows a simplified sectional view through a bearing area of the inventive pump.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a simplified sectional representation through a bearing area of an electric motor according to the invention used for a liquid pump, in this case, an oil pump, with a bearing shield 3, a connecting shaft 5, a spherical bearing 4, and a clamping spring 7. The clamping spring 7 is arranged in a cylindrical recess 9 of the bearing shield 3 and thus clamped to the inner surface of the recess 9 by a clamping ring area 10 having the shape of a cone surface. In addition to the clamping ring area 10, the clamping spring 7 consists of an annular contact area 11 and a bearing retention area 12 having the shape of a cone surface. The contact area 11 of the clamping spring 7 lies up against an annular contact area at the end of the recess 9. The recess 9 is here matched to the length of the spherical bearing 4 in such a way that the bearing retention area 12 having the shape of a cone surface applies a force $F_F$ to the spherical bearing 4 and presses it into a conical contact face 8 of the bearing shield 3. Due to the spherical external form of the spherical bearing 4, it is only in contact in a circumferential fashion with the conical contact face 8. Free spaces 13, 14 adjoin this circular line and permit or at least make it easier for the spherical bearing 4 to tilt. The spherical bearing 4 has a plurality of cup spring fingers, not visible here, which increase the elasticity of the clamping spring 7.

Figure 2:
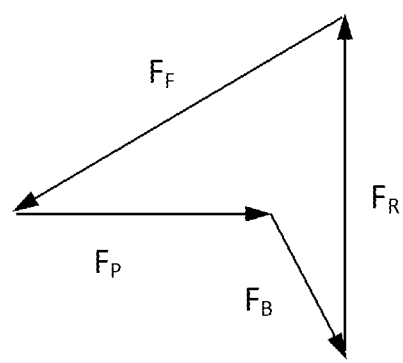
FIG. 2 shows a force diagram relating to FIG. 1.

FIG. 2 shows a force diagram relating to FIG. 1 with: a spring force $F_F$, which, at right angles to the bearing retention area 12, applies itself at a circular contact line between the bearing retention area 12 of the clamping spring 7 and the spherical external contour of the spherical bearing 4. A contact force $F_B$, which, at right angles to the conical contact face 8, applies itself at a circular contact line between the conical contact area and the spherical external contour of the spherical bearing 4. A fluid pressure force/oil pressure force $F_P$, which, due to a fluid pressure/oil pressure occurring in operation, acts in an axial direction on the spherical bearing. Finally, a radial force $F_R$ is largely generated in the pump. In the present exemplary embodiment, the angle of the force vector $F_B$ is 35° to the vertical, the angle of the force vector $F_F$ is 15° to the horizontal, the diameter of the spherical bearing ball is 20 mm, the pump pressure is 6 bars, the shaft diameter 8 mm, a projected area $A_P$, as contact area for liquid pressure/oil pressure, is 160 mm², a contact point distance from the axis $r_B$ is 8.2 mm, the coefficient of friction μ is 0.1, the cup length is 15 mm, the power component $F_P$ generated by the liquid pressure/oil pressure is 96.3 N, and the radial force $F_R$ is 200 N. This needs to be considered only in the direction of the radial force.

In the case of the greatest load forces, this results in 206 N for the spring force, 179 N for the contact force $F_B$, 38.5 Ncm for the adjustment moment, and 51.3 N for the force $F_{Rn}$ required for the adjustment.

In the case of no load forces $F_P$ and $F_R$, this results in 206 N for the spring force, 346 N for the contact force $F_B$, 55.3 Ncm for the adjustment moment, and 73.7 N for the force $F_{Rn}$ required for the adjustment.

Figure 3:
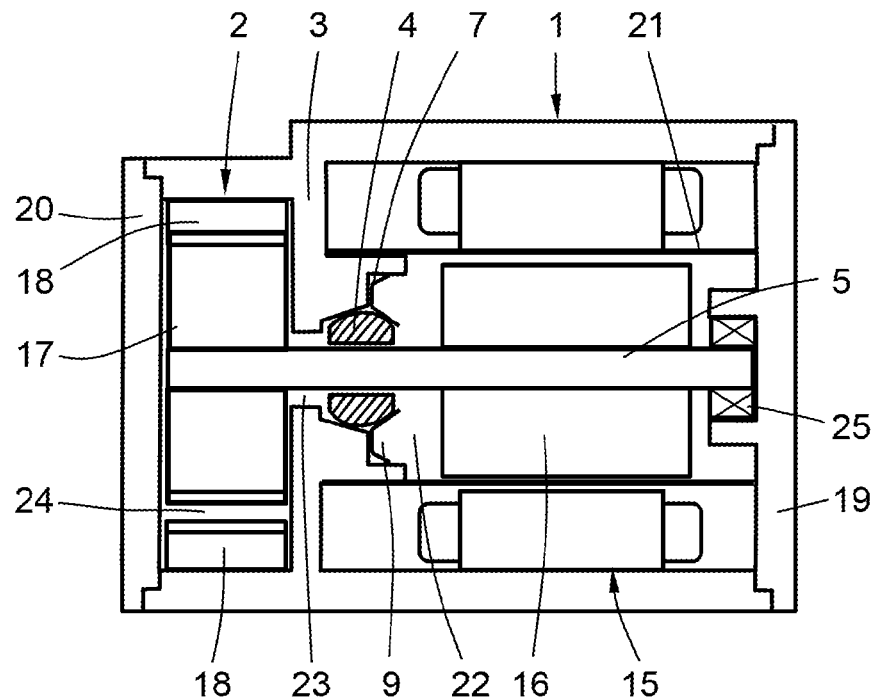
FIG. 3 shows a stylized representation of a liquid pump motor according to the invention.

FIG. 3 shows a stylized representation of an embodiment of an oil pump motor according to the invention, with an electric motor 1 and a gear pump 2. In the preferred embodiment, the gear pump takes the form of a gerotor pump. The electric motor 1 has a wound stator 15 and a permanent magnet rotor 16. A can 21 is arranged between the stator 15 and the permanent magnet rotor 16, sealing off the stator 15 from an oil-filled rotor compartment 22. An opening 23, here shown as an annular space between the connecting shaft 5 and the bearing shield 3, connects the rotor compartment 22 with a pump compartment 24. The connecting shaft 5 runs into a second motor bearing 25, accommodated in a motor housing cover 19, in a part of the electric motor 1 at a distance from the pump. The gerotor pump includes an internal gear 17, mounted immovably on the connecting shaft 5. The external teeth of the internal gear 17 mesh with the internal teeth of an external gear 18. The rotary movement of the internal gear 17 in the external gear 18 causes a change in the pump volume, which is defined by the teeth of the gears 17 and 18 and the outer walls of the oil pump, thereby creating a pumping effect. One outer wall is formed by the bearing shield 3 of the electric motor 1, and a second outer wall is formed by a pump housing cover 20. The spherical bearing 4, the clamping spring 7, and the recess 9 are also shown. Instead of an electronically commutated DC motor, a brush-commutated DC motor or another type of electric motor could, for example, be used.

Figure 4:
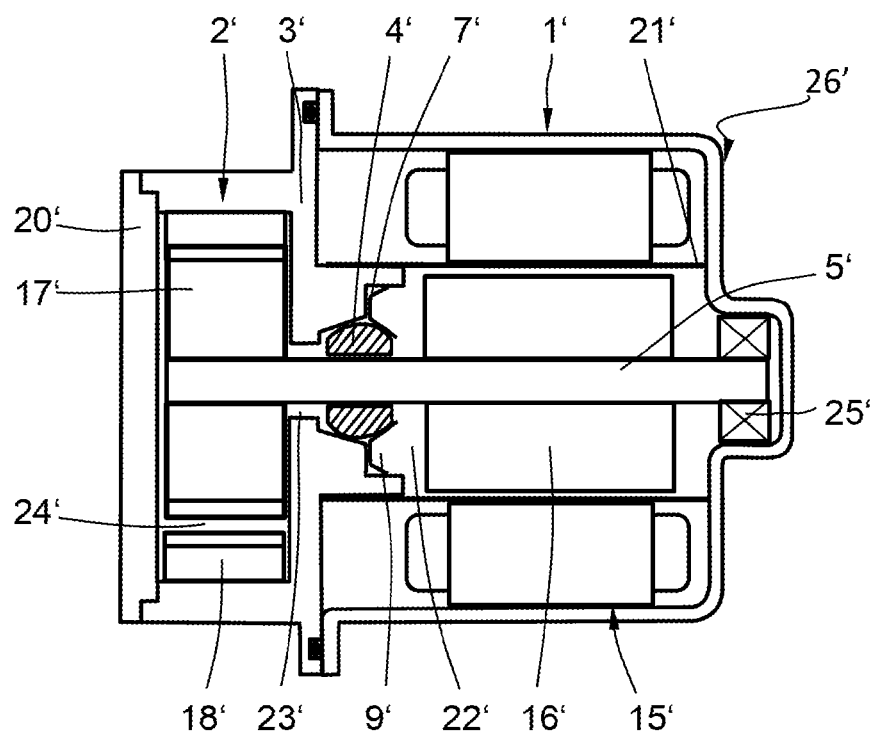
FIG. 4 shows a stylized representation of a variation of the oil pump motor according to the invention Note: The reference numbers with apostrophe and the corresponding reference numbers without apostrophe refer to details with the same name in the drawings and the drawing description. This reflects use in another embodiment or the prior art, and/or where the detail is a variant. The reference number list contains only reference numbers without apostrophe for the sake of simplicity.

FIG. 4 shows a stylized representation of a variation of the oil pump motor according to the invention, with an electric motor 1' and a gear pump 2', here also taking the form of a gerotor pump. The electric motor 1' has a wound stator 15' and a permanent magnet rotor 16'. A can 21' is arranged between the stator 15' and the permanent magnet rotor 16', sealing off the stator 15' from an oil-filled rotor compartment 22'. An opening 23', here shown as an annular space between a connecting shaft 5' and a bearing shield 3', connects the rotor compartment 22' with a pump compartment 24'. The connecting shaft 5' runs in a second motor bearing 25', accommodated in a pot housing 26', in a part of the electric motor 1' at a distance from the pump. The gerotor pump includes an internal gear 17', mounted immovably on the connecting shaft 5, whose external teeth mesh with the internal teeth of an external gear 18'. The rotary movement of the internal gear 17' in the external gear 18' causes a change in the pump volume, which is defined by the teeth of the gears 17', 18' and the outer walls of the oil pump, thereby creating a pumping effect. One outer wall is formed by the bearing shield 3' of the electric motor 1', and a second outer wall by a pump housing cover 20'. The spherical bearing 4', the clamping spring 7', and the recess 9' are also shown.

It is to be understood that the present invention is not limited to the illustrated embodiments described herein. Various types and styles of user interfaces may be used in accordance with the present invention without limitation. Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE NUMERALS

1 Electric motor
2 Gear pump
3 Bearing shield

4 Spherical bearing
5 Connecting shaft
6 Bearing gap
7 Clamping spring
8 Contact face
9 Recess
10 Clamping ring area
11 Contact area
12 Bearing retention area
13 First free space
14 Second free space
15 Stator
16 Permanent magnet rotor
17 Internal gear
18 External gear
19 Motor housing cover
20 Pump housing cover
21 Can
22 Rotor compartment
23 Opening
24 Pump compartment
25 Motor bearing
26 Pot housing

What is claimed is:

1. A liquid pump/motor combination comprising:
a positive displacement pump including a pump compartment;
an electric motor including a stator and a rotor, the rotor being in an oil-filled rotor compartment and the stator being sealed off from the oil-filled rotor compartment;
a bearing shield having a contact face, the bearing shield being arranged between the electric motor and the positive displacement pump;
a spherical bearing accommodated in the bearing shield, the spherical bearing being configured to be swivelable to a limited extent under application of a force;
a connecting shaft accommodated in the spherical bearing, the connecting shaft positioned within the oil-filled rotor compartment and the pump compartment;
a bearing gap between the spherical bearing and the connecting shaft, the bearing gap being between the inside diameter of the spherical bearing and the connecting shaft;
an annular space between the connecting shaft and the bearing shield connecting the oil-filled rotor compartment with the pump compartment, the annular space being filled with liquid from the oil-filled rotor compartment;
a recess in the bearing shield, the recess having a substantially hollow, cylindrical shape;
a clamping spring pressing the spherical bearing against the contact face and being clamped firmly in the recess, the contact face in at least some areas being one of conical, facet-shaped, and hollow-spherical; and
the spherical bearing, the connecting shaft, and the bearing gap functioning in operation together as a hydrodynamic sliding bearing.

2. The liquid pump/motor combination according to claim 1, wherein the clamping spring is so dimensioned that a force component acting axially on the spherical bearing is greater than a counterforce $F_P$ generated by a liquid pressure and acting axially on the spherical bearing.

3. The liquid pump/motor combination according to claim 1, wherein the clamping spring is so dimensioned that, due to the liquid between the spherical bearing and the connecting shaft, the spherical bearing is responsive to a tilting force with a magnitude sufficient to overcome the frictional force generated by the clamping spring in the recess.

4. The liquid pump/motor combination according to claim 1, wherein the spherical bearing is a sintered sleeve bearing and the spherical bearing has pore-shaped interstices.

5. The liquid pump/motor combination according to claim 1, wherein the positive displacement pump and the electric motor are integrated.

6. The liquid pump/motor combination according to claim 1, wherein the positive displacement pump is a gear pump.

7. A liquid pump/motor combination comprising:
a liquid pump including a pump compartment;
an electric motor including a stator and a rotor, the rotor being in an oil-filled rotor compartment and the stator being sealed off from the oil-filled rotor compartment;
a bearing shield having a contact face, the bearing shield being arranged between the electric motor and the liquid pump;
a spherical bearing accommodated in the bearing shield, the spherical bearing being configured to be swivelable to a limited extent under application of a force;
a connecting shaft accommodated in the spherical bearing, the connecting shaft positioned within the oil-filled rotor compartment and the pump compartment;
a bearing gap between the spherical bearing and the connecting shaft, the bearing gap being between the inside diameter of the spherical bearing and the connecting shaft;
an annular space between the connecting shaft and the bearing shield connecting the oil-filled rotor compartment with the pump compartment, the annular space being filled with liquid from the oil-filled rotor compartment;
a recess in the bearing shield, the recess having a substantially hollow, cylindrical shape;
a clamping spring pressing the spherical bearing against the contact face and being clamped firmly in the recess, the contact face in at least some areas being one of conical, facet-shaped, and hollow-spherical; and
the spherical bearing, the connecting shaft, and the bearing gap functioning in operation together as a hydrodynamic sliding bearing.

8. The liquid pump/motor combination according to claim 7, wherein the clamping spring is so dimensioned that a force component acting axially on the spherical bearing is greater than a counterforce $F_P$ generated by a liquid pressure and acting axially on the spherical bearing.

9. The liquid pump/motor combination according to claim 8, wherein the clamping spring is so dimensioned that, due to the liquid between the spherical bearing and the connecting shaft, the spherical bearing is responsive to a tilting force with a magnitude sufficient to overcome the frictional force generated by the clamping spring in the recess.

* * * * *